US007749322B2

(12) United States Patent
Schumacher et al.

(10) Patent No.: US 7,749,322 B2
(45) Date of Patent: Jul. 6, 2010

(54) ALUMINIUM OXIDE POWDER PRODUCED BY FLAME HYDROLYSIS AND HAVING A LARGE SURFACE AREA

(75) Inventors: Kai Schumacher, Hofheim (DE); Rainer Golchert, Dieburg (DE); Roland Schilling, Freigericht (DE); Christoph Batz-Sohn, Hanau-Mittelbuchen (DE); Martin Moerters, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 911 days.

(21) Appl. No.: 10/583,723

(22) PCT Filed: Nov. 30, 2004

(86) PCT No.: PCT/EP2004/013564

§ 371 (c)(1),
(2), (4) Date: Jun. 20, 2006

(87) PCT Pub. No.: WO2005/061385

PCT Pub. Date: Jul. 7, 2005

(65) Prior Publication Data

US 2007/0111880 A1    May 17, 2007

(30) Foreign Application Priority Data

Dec. 20, 2003    (DE) ................ 103 60 087

(51) Int. Cl.
*C04B 14/04*    (2006.01)
*B24D 3/02*    (2006.01)
*C01F 1/00*    (2006.01)

(52) U.S. Cl. .................... 106/484; 51/309; 423/111

(58) Field of Classification Search .......... 106/484; 423/323, 336, 437–438, 111; 51/309

See application file for complete search history.

(56) References Cited

U.S. PATENT DOCUMENTS 6,063,354 A * 5/2000 Mangold et al. ............ 423/336

(Continued)

FOREIGN PATENT DOCUMENTS

DE    101 49 130    4/2003

(Continued)

*Primary Examiner*—Jerry Lorengo
*Assistant Examiner*—Shuangyi Abu Ali
(74) *Attorney, Agent, or Firm*—Oblon, Spivak, McClelland, Maier & Neustadt, L.L.P.

(57) ABSTRACT

Aluminium oxide powder produced by flame hydrolysis and consisting of aggregates of primary particles, having a BET surface area of from 100 to 250 $m^2/g$, a dibutyl phthalate absorption of from 50 to 450 g/100 g of aluminium oxide powder, which powder shows only crystalline primary particles in high-resolution TEM pictures. It is prepared by vaporizing aluminium chloride, transferring the vapour by means of a carrier gas to a mixing chamber and, separately therefrom, supplying hydrogen, air (primary air), which may optionally be enriched with oxygen and/or may optionally be pre-heated, to the mixing chamber, then igniting the mixture of aluminium chloride vapour, hydrogen, air in a burner and burning the flame into a reaction chamber that is separated from the surrounding air, subsequently separating the solid material from the gaseous substances and then treating the solid material with steam and optionally with air, the discharge rate of the reaction mixture from the mixing chamber into the reaction chamber being at least 10 m/s, and the lambda value being from 1 to 10 and the gamma value being from 1 to 15. It can be used as an ink-absorbing substance in ink-jet media.

17 Claims, 2 Drawing Sheets

Figure 1A:
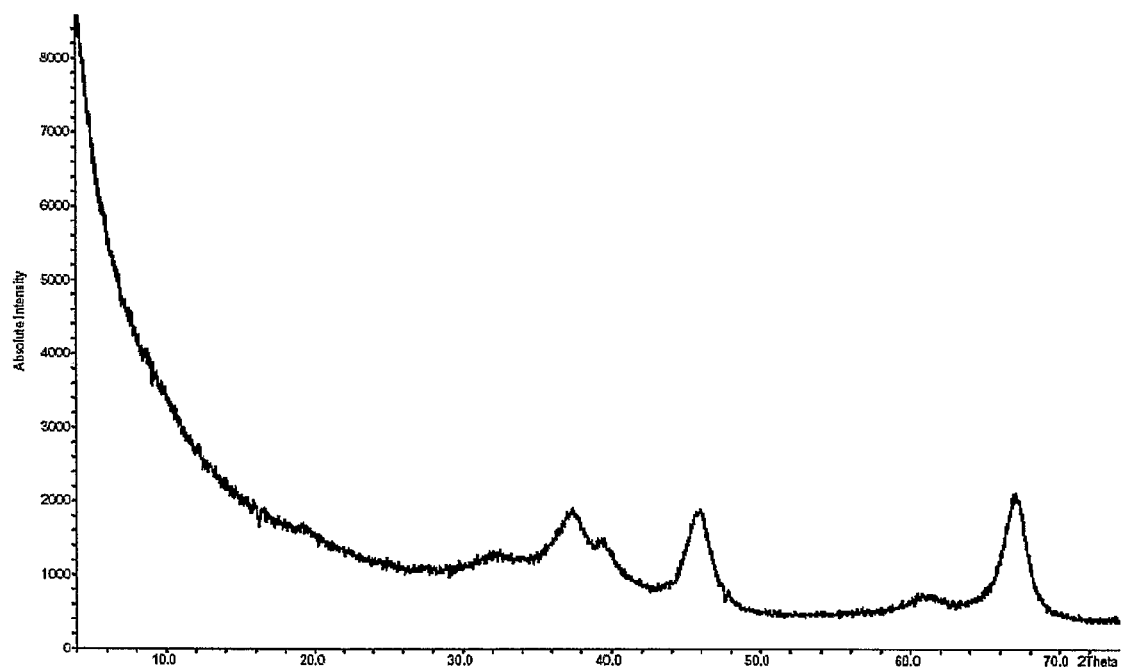

U.S. PATENT DOCUMENTS 6,193,795 B1 * 2/2001 Nargiello et al. ............ 106/484
6,743,269 B2 * 6/2004 Meyer et al. .................. 51/309

FOREIGN PATENT DOCUMENTS

| EP | 0 023 588 | 2/1981 |
| EP | 0 585 544 | 3/1994 |
| EP | 0 717 008 | 6/1996 |
| EP | 0 855 368 | 7/1998 |
| EP | 1 048 617 | 11/2000 |
| EP | 1 083 151 | 3/2001 |
| EP | 1 160 200 | 12/2001 |
| GB | 661 685 | 11/1951 |

* cited by examiner

ALUMINIUM OXIDE POWDER PRODUCED BY FLAME HYDROLYSIS AND HAVING A LARGE SURFACE AREA

The present invention relates to an aluminium oxide powder produced by flame hydrolysis and having a large surface area, and to its production and use.

It is known to produce aluminium oxide powder by means of pyrogenic processes. Pyrogenic processes include flame hydrolysis, in which an aluminium halide, generally aluminium chloride, is hydrolysed at high temperatures with the formation of aluminium oxide and hydrochloric acid according to Eq. 1, $$2AlCl_3 + 3H_2O \rightarrow Al_2O_3 + 6HCl \quad \text{(Eq. 1)}$$

$$4AlCl_3 + 3O_2 \rightarrow 2Al_2O_3 + 6Cl_2 \quad \text{(Eq. 2)}.$$

Aluminium oxide C, Degussa AG, for example, is produced in this manner. Aluminium oxide C has a surface area of approximately 90 $m^2/g$.

A further aluminium oxide powder produced by flame hydrolysis is the powder from Cabot. It has a BET surface area of 55 $m^2/g$ and comprises about 56% theta and 20% delta crystal modifications as well as 24% amorphous constituents.

EP-A-1083151 describes an aluminium oxide powder having a BET surface area of more than 115 $m^2/g$, which powder at the same time has a Sears index of more than 8 ml/2 g and the dibutyl phthalate absorption of which cannot be determined. The example describes a powder having a BET surface area of 121 $m^2/g$ and a Sears index of 9.38 ml/2 g.

U.S. Pat. No. 3,663,283 describes a process for the production of metal oxide powders by flame hydrolysis. Although an example relating to aluminium oxide is given, the aluminium oxide is described only as being finely divided with narrow particle distribution. Further details are not given.

In U.S. Pat. No. 5,527,423 there is claimed a dispersion that contains precipitated aluminium oxide or aluminium oxide produced by flame hydrolysis having a BET surface area of from 40 to 430 $m^2/g$. The manner in which such aluminium oxide powders are obtained is not disclosed, however. In the examples, aluminium oxide powders having a BET surface area only within a narrow range of from 55 to 100 $m^2/g$ are disclosed.

In EP-A-1256548, aluminium oxide particles are disclosed having a mean primary particle diameter of from 5 to 100 nm and a mean aggregate diameter of from 50 to 80 nm are. The particles may be amorphous or crystalline. The proportion of particles larger than 45 μm is preferably 0.05 wt. % or less. These aluminium oxide particles are said to be obtainable by a gas-phase reaction of aluminium chloride with oxygen and/or steam, wherein the reactants are pre-heated, at temperatures of about 800° C. and subsequent separation of the aluminium oxide that is formed from gaseous substances. Oxygen, water and oxygen/water mixtures are to be used as the oxidising agents in the reaction.

This reaction is, however, a gas-phase reaction, not flame hydrolysis or flame oxidation. The powder obtained in accordance with EP-A-1256548 has a different structure and different properties than a powder obtained by flame hydrolysis or flame oxidation. For example, the proportion of chloride may be up to several wt. %. The powder can have an undesirable grey colour, which may be attributable to aluminium oxychloride constituents resulting from the incomplete reaction of aluminium chloride.

Many possible uses of aluminium oxide powders are known. They are used in the paper industry, in particular in ink-jet papers. Aluminium oxide powders affect, inter alia, the gloss, the brilliance of colour, the adhesion and the ink absorption. The increasing demands that are made of ink-jet papers require the values of these parameters to be improved.

Aluminium oxide powders are also used as an abrasive in dispersions for polishing oxidic and metallic coatings in the electronics industry (chemical mechanical polishing, CMP). Here too, the continued miniaturisation of the components requires customised abrasives which allow surfaces in the nanometer range to be polished without scratching.

The object of the invention is to provide an aluminium oxide powder that meets the increased demands in the fields of ink-jet and CMP. In particular, it should be possible to incorporate the powder into dispersions easily and with high degrees of filling. A further object of the invention is a process for the production of such a powder.

The invention provides an aluminium oxide powder produced by flame hydrolysis and consisting of aggregates of primary particles, which powder is characterised in that
- it has a BET surface area of from 100 to 250 $m^2/g$,
- the dibutyl phthalate absorption is from 50 to 450 g/100 g of aluminium oxide powder, and
- it shows only crystalline primary particles on high-resolution TEM pictures.

The aluminium oxide powder according to the invention preferably has an OH density of from 8 to 12 $OH/nm^2$.

The chloride content of the aluminium oxide powder according to the invention is preferably less than 1.5 wt. %.

It is also preferred for the proportion of particles having a diameter greater than 45 μm to be in a range of from 0.0001 to 0.05 wt. %.

Preference may also be given to an aluminium oxide powder according to the invention which in the X-ray diffractogram exhibits an intensity, expressed as the counting rate, of more than 50 at an angle 2 theta of 67°.

Such an aluminium oxide powder may exhibit the signals of gamma-, theta- and/or delta-aluminium oxide in the X-ray diffractogram, the signal of gamma-aluminium oxide generally being the most intense.

It is also possible for the aluminium oxide powder according to the invention to exhibit in the X-ray diffractogram an intensity, expressed as the counting rate, of less than 50 at an angle 2 theta of 67°. Such a powder is X-ray amorphous to the greatest possible extent.

Preference may be given to an aluminium oxide powder
- in which the BET surface area is from 120 to 200 $m^2/g$, the dibutyl phthalate absorption is from 150 to 350 g/100 g of aluminium oxide powder, the OH density is from 8 to 12 $OH/nm^2$, and which
- shows only crystalline primary particles in high-resolution TEM pictures, and which
- in the X-ray diffractogram has signals with an intensity, expressed as the counting rate, of more than 50 at an angle 2 theta of 67°, and exhibits signals of gamma-, theta- and/or delta-aluminium oxide.

In such a powder, a BET surface area of from 125 to 150 $m^2/g$ is particularly preferred.

Preference may further be given to an aluminium oxide powder
- in which the BET surface area is from 120 to 200 $m^2/g$, the dibutyl phthalate absorption is from 150 to 350 g/100 g of aluminium oxide powder, the OH density is from 8 to 12 $OH/nm^2$, which powder
- shows only crystalline primary particles in high-resolution TEM pictures and
- in the X-ray diffractogram exhibits an intensity, expressed as the counting rate, of less than 50 at an angle 2 theta of 67°.

In the case of such a powder, a BET surface area of from 135 to 190 m²/g is particularly preferred.

The invention further provides a process for the production of the aluminium oxide powder according to the invention, in which aluminium chloride is vaporised, the vapour is transferred by means of a carrier gas to a mixing chamber and, separately therefrom, hydrogen, air (primary air), which may optionally be enriched with oxygen and/or may optionally be pre-heated, are supplied to the mixing chamber, then the mixture of aluminium chloride vapour, hydrogen and air is ignited in a burner and the flame burns into a reaction chamber that is separated from the surrounding air, the solid material is subsequently separated from gaseous substances, and the solid material is then treated with steam and optionally with air, the discharge rate of the reaction mixture from the mixing chamber into the reaction chamber being at least 10 m/s, and the lambda value being from 1 to 10 and the gamma value being from 1 to 15.

The structure of the aluminium oxide powders according to the invention in respect of their X-ray crystalline or X-ray amorphous state can be controlled by varying the aluminium chloride concentration in the gas stream. High aluminium oxide concentrations in the gas stream yield an X-ray crystalline powder.

The definition of a high aluminium chloride concentration is dependent on the structure of the reactor; a range from 0.2 to 0.6 kg of $AlCl_3/m^3$ of gas can be used as a reference point for a production installation.

If the aluminium chloride concentration in the same production installation is multiplied by a factor of from 0.4 to 0.6, a powder that is X-ray amorphous to the greatest possible extent is obtained.

In addition to adjustments that yield X-ray crystalline powders or powders that are X-ray amorphous to the greatest possible extent, it is also possible, by varying the aluminium concentration in the gas stream, to obtain powders that, for example, contain a defined proportion of X-ray amorphous aluminium oxide.

In a particular embodiment of the process according to the invention, a secondary gas consisting of air and/or nitrogen can be introduced into the reaction chamber. The ratio primary air/secondary gas preferably has values of from 10 to 0.5. The introduction of a secondary gas can help to avoid caking in the reaction chamber.

The invention relates also to the use of the aluminium oxide powder according to the invention as an ink-absorbing substance in ink-jet media.

The invention relates also to the use of the aluminium oxide powder according to the invention as an abrasive.

The invention relates also to the use of the aluminium oxide powder according to the invention in dispersions.

The invention relates also to the use of the aluminium oxide powder according to the invention as a filler, as a carrier, as a catalytically active substance, as a ceramics base, in the electronics industry, in the cosmetics industry, as an additive in the silicone and rubber industry, for adjusting the rheology of liquid systems, for heat stabilisation, in the surface coatings industry.

EXAMPLES

Analysis

The BET surface area of the particles is determined in accordance with DIN 66131.

The X-ray diffractograms are determined by means of a transmission diffractometer from Stoe & Cie Darmstadt, Germany. The parameters are: CuK alpha radiation, excitation 30 mA, 45 kV, OED.

The dibutyl phthalate absorption is measured with a RHEOCORD 90 device from Haake, Karlsruhe. For that purpose, 16 g, accurate to 0.001 g, of the aluminium oxide powder are introduced into a kneading chamber, the chamber is closed with a lid, and dibutyl phthalate is metered in through a hole in the lid at a predetermined metering rate of 0.0667 ml/s. The kneader is operated at a motor speed of 125 revolutions per minute. When the maximum torque is reached, the kneader and the DBP metering are automatically switched off. From the amount of DBP that has been consumed and the quantity of particles weighed in, the DBP absorption is calculated as follows:

$DBP$ number (g/100 g)=($DBP$ consumption in g/weighed portion of particles in g)×100.

The hydroxyl group density is determined in accordance with the method published by J. Mathias and G. Wannemacher in Journal of Colloid and Interface Science 125 (1988), by reaction with lithium aluminium hydride.

Measurement of the Sears index is described in EP-A-717008.

gamma=$H_2$ supplied/stoichiometrically required $H_2$ lambda=$O_2$ supplied/stoichiometrically required $O_2$ Example 1

2.76 kg/h of $AlCl_3$ are vaporised in a vaporiser. The vapours are transferred by means of an inert gas (2.00 Nm³/h) to a mixing chamber. Separately therefrom, 3.04 Nm³/h of hydrogen and 10.00 Nm³/h of air are introduced into the mixing chamber. In a central pipe, the reaction mixture is fed to a burner and ignited. The discharge rate of the reaction mixture from the burner is 31.4 m/s. The flame burns into a water-cooled flame tube. 20 Nm³/h of secondary air are additionally introduced into the reaction chamber. The powder that forms is separated off in a downstream filter and then treated countercurrently with air and steam at about 600° C. The physico-chemical data of the powder are shown in Table 2.

Examples 2 to 8 are carried out analogously to Example 1. The process parameters and the physico-chemical data of the powders are to be found in Table 1.

Figure 1B:
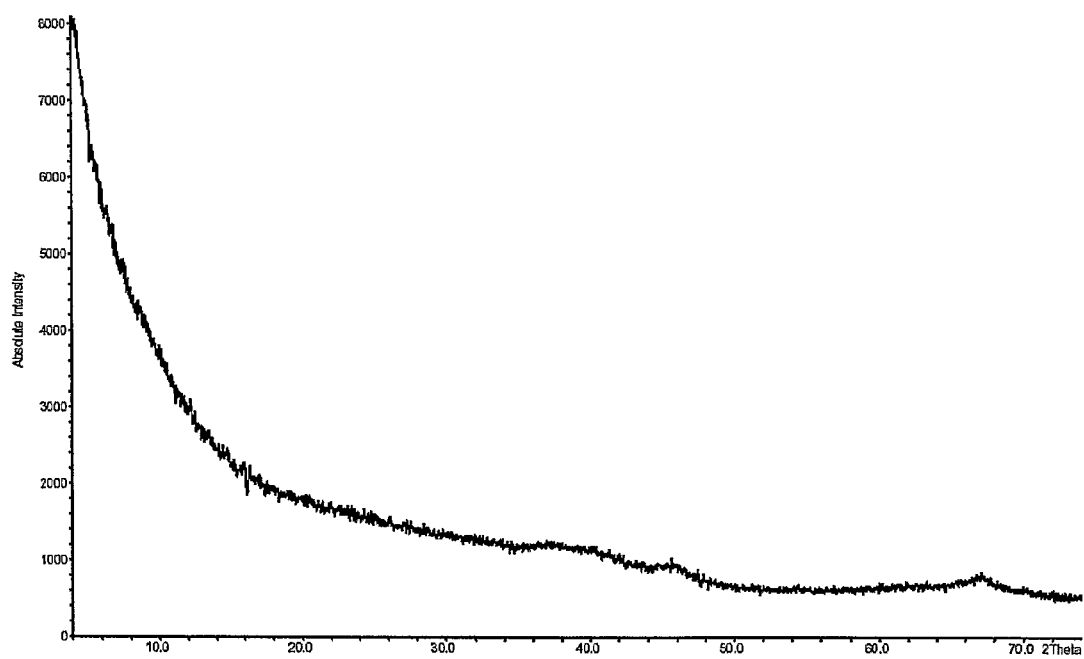
Figure 2:
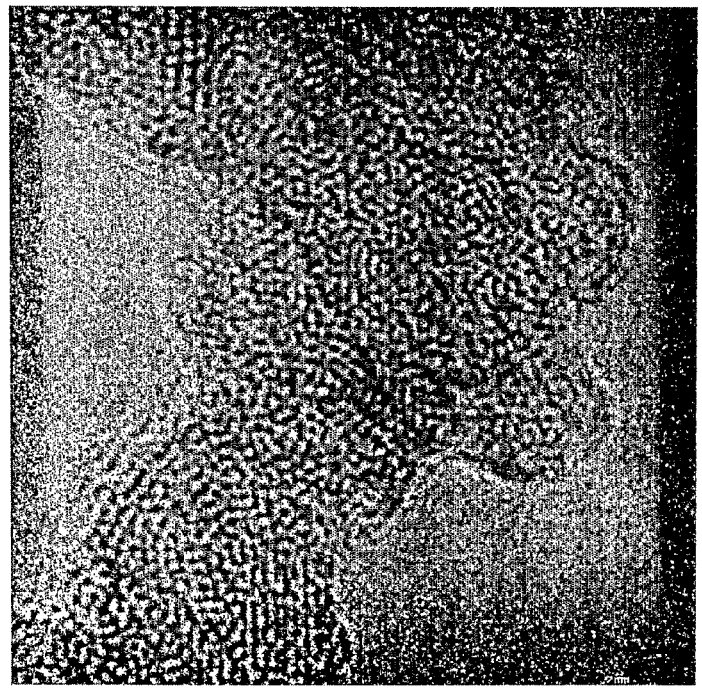

FIG. 1A shows the X-ray diffractogram of the powder from Example 1, FIG. 1B shows that of the powder from Example 4. The X-ray diffractogram of the powder from Example 1 clearly shows the signals of aluminium oxide modifications. The powder from Example 4, on the other hand, shows only a very weak signal at 2 theta=67° and is to be characterised as X-ray amorphous to the greatest possible extent. The primary particles of both powders consist of crystalline primary particles. FIG. 2 shows a high-resolution TEM picture of the powder from Example 4, which shows this situation.

TABLE 1

Process settings and physico-chemical data of the $Al_2O_3$ powders

| | | Example | | | | | | | |
|---|---|---|---|---|---|---|---|---|---|
| | | 1 | 2 | 3 | 4 | 5 | 6 | 7 | 8 |
| $AlCl_3$ | kg/h | 2.76 | 2.76 | 2.76 | 1.25 | 1.25 | 1.25 | 1.25 | 1.25 |
| Hydrogen | $Nm^3/h$ | 3.04 | 3.04 | 3.04 | 1.90 | 1.9 | 1.9 | 1.9 | 3.5 |
| Primary air | $Nm^3/h$ | 10.00 | 9.15 | 9.5 | 13.50 | 13 | 13.8 | 8.25 | 15 |
| Secondary air | $Nm^3/h$ | 20.00 | 20.00 | 20.00 | 20.00 | 20.00 | 20.00 | 20.00 | 20.00 |
| Inert gas | $Nm^3/h$ | 2.00 | 2.00 | 2.00 | 2.00 | 2.00 | 2.00 | 2.00 | 2.00 |
| Total gases | $Nm^3/h$ | 35.04 | 34.19 | 34.54 | 37.4 | 36.9 | 37.7 | 30.75 | 40.5 |
| $AlCl_3$/Total gases | $kg/Nm^3$ | 0.079 | 0.081 | 0.080 | 0.033 | 0.034 | 0.033 | 0.041 | 0.031 |
| gamma$^\#$ | | 4.37 | 4.37 | 4.37 | 6.03 | 6.03 | 6.03 | 1.59 | 11.1 |
| lambda$^\#$ | | 1.38 | 1.26 | 1.31 | 7.38 | 7.27 | 7.45 | 6.91 | 1.79 |
| $v_B$* | m/s | 31.4 | 29.7 | 30.4 | 35.4 | 34.0 | 36.0 | 22.9 | 43.4 |
| BET surface area | m2/g | 175 | 104 | 125 | 181 | 124 | 195 | 192 | 101 |
| XRD counting rate at 2 theta = 67° | | 400 | 500 | 650 | 15 | 5 | 0 | 22 | 10 |
| DBP number | g/100 g | 280 | 160 | 204 | 284 | 215 | 315 | 301 | 154 |
| OH density | $OH/nm^2$ | 8.7 | 8.1 | 10.5 | 8.9 | 11.4 | 8.9 | 11.1 | 9.6 |
| Sears index | ml/2 g | 15.3 | 17.8 | 24.5 | 23.1 | 25.3 | 227 | 24.5 | 21.5 |
| pH | | 5.3 | 5.1 | 5.4 | 5.5 | 5.5 | 5.1 | 5.2 | 5.3 |
| Bulk density | g/l | 20 | 19 | 18 | 20 | 21 | 20 | 19 | 19 |
| Tamped density | g/l | 26 | 24 | 26 | 28 | 25 | 28 | 31 | 27 |
| Chloride content | wt. % | 1.2 | 0.8 | 1.0 | 1.3 | 0.9 | 1.4 | 1.4 | 0.7 |
| Proportion >45 μm | % | | | | | | | | |

*$v_B$ = discharge rate at the mouth of the burner;
$^\#$based on core gases primary air, hydrogen, inert gas

The invention claimed is:

1. An aluminium oxide powder produced by flame hydrolysis which has
   a BET surface area ranging from 135 to 190 $m^2$/g,
   a dibutyl phthalate absorption ranging from 150 to 350 g/100 g of aluminium oxide powder,
   an OH density ranging from 8 to 12 $OH/nm^2$;
   wherein high-resolution TEM pictures show only crystalline primary particles; and
   wherein an X-ray diffractogram of the aluminium oxide powder exhibits an intensity, expressed as the counting rate, of less than 50 at an angle 2 theta of 67°.

2. The aluminium oxide powder produced by flame hydrolysis according to claim 1, which has a chloride content of less than 1.5 wt. %.

3. The aluminium oxide powder produced by flame hydrolysis according to claim 1, wherein the proportion of particles having a diameter greater than 45 μm ranges from 0.0001 to 0.05 wt. %.

4. A process for producing the aluminium oxide powder produced by flame hydrolysis according to claim 1, comprising:
   vaporizing aluminium chloride to produce a vapour,
   transferring the vapour by means of a carrier gas to a mixing chamber to produce a gas containing 0.08 to 0.36 kg of $AlCl_3/m^3$ of gas and, separately therefrom,
   supplying hydrogen and air (primary air) to the mixing chamber, wherein the hydrogen and air may optionally be enriched with oxygen and/or may optionally be preheated, then
   igniting the mixture of aluminium chloride vapour, hydrogen and air in a burner which produces a flame which burns into a reaction chamber that is separated from the surrounding air,
   separating the solid material produced by the flame from the gaseous substances, and
   treating the solid material with steam and optionally with air;
   wherein the discharge rate of the reaction mixture from the mixing chamber into the reaction chamber is at least 10 m/s, and the lambda value ranges from 1 to 10 and the gamma value ranges from 1 to 15.

5. The process according to claim 4, wherein a secondary gas consisting of air and/or nitrogen is introduced into the reaction chamber.

6. The process according to claim 4, wherein the ratio primary air/secondary gas is from 10 to 0.5.

7. A method for absorbing ink into an ink-jet paper or another ink-jet medium comprising incorporating the aluminium oxide powder produced by flame hydrolysis according to claim 1 into the paper or an ink-jet medium.

8. A method for abrading or polishing a oxidic or metallic coating or other object comprising contacting said coating or object with the aluminium oxide powder produced by flame hydrolysis according to claim 1.

9. A method for making a dispersion comprising incorporating the aluminium oxide powder produced by flame hydrolysis according to claim 1 into a composition.

10. A method of using as a filler, as a carrier, as a catalytically active substance, as a ceramics base, in the electronics industry, in the cosmetics industry, as an additive in the silicone and rubber industry, for adjusting the rheology of liquid systems, for heat stabilisation, in the surface coatings industry the aluminum oxide powder produced by flame hydrolysis according to claim 1.

11. A composition comprising the aluminum oxide powder produced by flame hydrolysis of claim 1.

12. The composition of claim 11, which contains the aluminum oxide powder as a filler or as a carrier.

13. The composition of claim 11, which contains the aluminum oxide powder as a catalytically active ingredient.

14. A ceramics base comprising the aluminum oxide powder produced by flame hydrolysis of claim 1.

15. A cosmetic comprising the aluminum oxide powder produced by flame hydrolysis of claim 1.

16. A silicone or rubber product comprising the aluminum oxide powder produced by flame hydrolysis of claim 1.

17. An ink-jet paper or other ink-jet medium comprising the aluminum oxide powder produced by flame hydrolysis of claim 1.

* * * * *